United States Patent
Watanabe et al.

(10) Patent No.: US 11,870,384 B2
(45) Date of Patent: Jan. 9, 2024

(54) SPEED CALCULATION DEVICE AND POWER CONVERSION DEVICE

(71) Applicant: Hitachi Industrial Equipment Systems Co., Ltd., Tokyo (JP)

(72) Inventors: Hiroshi Watanabe, Tokyo (JP); Masataka Sasaki, Tokyo (JP); Masahiro Hiraga, Tokyo (JP); Yusuke Arao, Tokyo (JP); Atsuhiko Nakamura, Tokyo (JP); Hiroyuki Tomita, Tokyo (JP); Kazushige Hotta, Tokyo (JP); Yusaku Onuma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 211 days.

(21) Appl. No.: 16/644,207

(22) PCT Filed: Jun. 13, 2018

(86) PCT No.: PCT/JP2018/022567
§ 371 (c)(1),
(2) Date: Mar. 4, 2020

(87) PCT Pub. No.: WO2019/073633
PCT Pub. Date: Apr. 18, 2019

(65) Prior Publication Data
US 2021/0075347 A1    Mar. 11, 2021

(30) Foreign Application Priority Data
Oct. 10, 2017    (JP) .................. 2017-196591

(51) Int. Cl.
*H02H 3/44*    (2006.01)
*H02P 1/18*    (2006.01)
*H02P 6/17*    (2016.01)

(52) U.S. Cl.
CPC ...................... *H02P 6/17* (2016.02)

(58) Field of Classification Search
CPC ...................... H02P 1/52; H02P 6/08
See application file for complete search history.

(56) References Cited

U.S. PATENT DOCUMENTS 5,502,376 A    3/1996    Busch
6,031,966 A    2/2000    Nakatani et al.
(Continued)

FOREIGN PATENT DOCUMENTS

CN    103947101 A    7/2001
JP    10-174473 A    6/1998
(Continued)

OTHER PUBLICATIONS

Xiaoyan, W. et al. "Typical Issues Analysis and Corresponding Strategy for Incremental Encoder Speed Measurement", Transactions of China Electrotechnical Society, Feb. 27, 2012, pp. 185-189 and 209, vol. 27, No. 2, with English abstract (six (6) pages).
(Continued)

*Primary Examiner* — Kawing Chan
*Assistant Examiner* — Charles S Laughlin
(74) *Attorney, Agent, or Firm* — Crowell & Moring LLP (57) ABSTRACT

The purpose of the present invention is to provide a speed detection method for maintaining a fine time axis resolution and a power conversion device that uses the method. This power conversion device comprises an inverter for converting DC voltage into AC voltage and supplying the same to a motor, a motor speed calculation unit for calculating the speed of the motor from output pulses obtained from an encoder connected to the motor, and a control unit for receiving the motor speed from the motor speed calculation unit and controlling the inverter. In the power conversion device, the motor speed calculation unit measures the duty (Continued)

cycle of the output pulses, calculates the speed using the half cycles of the output pulses if the duty cycle is within a prescribed range from 50%, and calculates the speed using the full cycles of the output pulses if the duty ratio is outside of the prescribed range from 50%.

14 Claims, 5 Drawing Sheets

(56) References Cited

U.S. PATENT DOCUMENTS

| | | | |
|---|---|---|---|
| 2001/0024101 A1* | 9/2001 | Tanaka | H02P 7/2805 |
| | | | 318/800 |
| 2004/0112053 A1* | 6/2004 | Yamada | F02B 39/16 |
| | | | 60/602 |
| 2013/0046486 A1 | 2/2013 | Pennell | |
| 2013/0093372 A1* | 4/2013 | Thyagarajan | H02P 21/18 |
| | | | 318/400.04 |
| 2015/0295589 A1* | 10/2015 | Eddleman | H03M 1/822 |
| | | | 341/152 |
| 2016/0077121 A1* | 3/2016 | Lee | G01P 3/481 |
| | | | 702/147 |

FOREIGN PATENT DOCUMENTS

| | | |
|---|---|---|
| JP | 2008-39722 A | 2/2008 |
| JP | 2009-294199 A | 12/2009 |
| JP | 2011-64578 A | 3/2011 |
| JP | 2012-58176 A | 3/2012 |

OTHER PUBLICATIONS

English translation of Chinese Office Action issued in Chinese Application No. 201880053988.4 dated Jul. 5, 2021 (9 pages).

Supplementary Partial European Search Report issued in European Application No. 18866093.0 dated May 18, 2021 (sixteen (16) pages).

International Search Report (PCT/ISA/210) issued in PCT Application No. PCT/JP2018/022567 dated Jul. 24, 2018 with English translation (five pages).

Japanese-language Written Opinion (PCT/ISA/237) issued in PCT Application No. PCT/JP2018/022567 dated Jul. 24, 2018 with English translation (five pages).

* cited by examiner

SPEED CALCULATION DEVICE AND POWER CONVERSION DEVICE

TECHNICAL FIELD

The present invention relates to a speed calculation device and a power conversion device that uses the device.

BACKGROUND ART

Among conventional power conversion devices, there is also one that can input an encoder signal in order to detect the speed and the position of a motor. For the detection of the rotation speed of the motor, there has been a method for measuring the full cycles or the half cycles of the pulse waves of the encoder signal (for example, see PTL 1).

CITATION LIST

Patent Literature

PTL 1: Japanese Patent Application Laid-Open No. 2009-294199

SUMMARY OF INVENTION

Technical Problem

The motor rotation speed detection method by measuring the encoder signal full cycle or the encoder signal half cycle in the power conversion device is (1) a method for fixing the motor rotation speed detection method to one of the method for measuring the encoder signal full cycle and the method for measuring the encoder signal half cycle (hereinafter, sometimes called a "fixing method"), or (2) a method in which the user selects one of the method for measuring the encoder signal full cycle and the method for measuring the encoder signal half cycle by parameter setting before the start of use (hereinafter, sometimes called a "selection method").

Here, since the half cycle measurement method can determine the speed for a shorter time, it can finely measure a time axis detection resolution (detection frequency), which is advantageous. The half cycle measurement method is thus desired to be used from the viewpoint of the accuracy, but even in the case of using the encoder having a configuration in which mechanically, slits and the like as portions of signal generation means are provided at fixed intervals in the rotation angle direction, there is the case where in a transmission path method including the electronic circuit to the power conversion device (the case of an open collector method and the like), even when the motor is actually rotated at a constant speed, the duty of its signal is not maintained at 50%.

In the case of applying the half cycle detection method when the duty cycle 50% of the signal is not ensured, the time of the half cycle from the rising edge to the falling edge of the signal and the time of the half cycle from the falling edge to the rising edge of the signal are different. Consequently, the different motor speeds respectively derived from these are alternately calculated, and as a result, the correct motor speed cannot be detected. Even when a smoothing filter is previously applied so that the motor speed is read from the detection result, the detected speed is not stable, and is sometimes deviated from the actual speed.

As described above, there is the case where it is desired that the full cycle measurement method or the half cycle measurement method can be selected and applied according to the state of the duty cycle of the signal.

In such a case, the method for fixing the motor rotation speed detection method to the full cycle or the half cycle (fixing method) requires the replacement of the main body of the power conversion device or its additional device or substrate, or the change or replacement of the transmission path method from the encoder to the power conversion device.

In addition, the method in which the user selects the full cycle or the half cycle by parameter setting before the start of use (selection method) requires parameter resetting. Therefore, for the stable motor driving, typically, after the power conversion device is stopped and the motor stops its rotation, the parameter resetting is performed, with the result that the number of steps from the installation of the power conversion device to the start of the operation has been larger.

In addition, there is the case where the duty cycle is deviated from 50% due to the aging change and the like of the transmission path from the encoder to the power conversion device. In this case, there is a possibility that an error is caused in the measurement without depending on the fixing method or the selection method, and the power conversion device and its host device recognize that the measurement value is abnormal, thus leading to system stop. Also, when the power conversion device performs speed control using the speed detection result from the encoder, the state in which the instability of the motor speed is caused, and the load to the machine connected to the motor is increased to lead to damage has also been assumed.

Accordingly, an object of the present invention is to provide a speed detection method that reduces the number of troublesome steps due to the above speed detection method selection, maintains an extremely fine time axis resolution, and achieves stable operation, and a power conversion device that uses the method.

Solution to Problem

An aspect of the present invention is a speed calculation device that calculates the speed of an object to be driven from output pulses obtained from an encoder connected to the object to be driven. This device measures the duty cycle of the output pulses, calculates the speed using the half cycles of the output pulses if the duty cycle is within a prescribed range, and calculates the speed using the full cycles of the output pulses if the duty cycle is outside of the prescribed range.

Another aspect of the present invention is a power conversion device that has an inverter for converting DC voltage into AC voltage and supplying the same to a motor, a motor speed calculation unit for calculating the speed of the motor from output pulses obtained from an encoder connected to the motor, and a control unit for receiving the motor speed from the motor speed calculation unit and controlling the inverter. In this power conversion device, the motor speed calculation unit measures the duty cycle of the output pulses, calculates the speed using the half cycles of the output pulses if the duty cycle is within a prescribed range from 50%, and calculates the speed using the full cycles of the output pulses if the duty ratio is outside of the prescribed range from 50%.

A further aspect of the present invention is a power conversion device that has an inverter for converting DC voltage into AC voltage and supplying the same to a motor, a speed calculation unit for calculating the speed of the motor from output pulses obtained from an encoder connected to the motor, and a control unit for receiving the motor speed from the speed calculation unit and controlling the inverter. In this power conversion device, the speed calculation unit measures the duty cycle during constant speed of the output pulses, measures a first half cycle of the output pulse to calculate the motor speed by first calculation using the duty cycle during constant speed with respect to the first half cycle, and measures a second half cycle of the output pulse to calculate the motor speed by second calculation using the duty cycle during constant speed with respect to the second half cycle.

Advantageous Effects of Invention

According to the present invention, the number of troublesome steps due to the speed detection method selection can be reduced, and the extremely fine time axis resolution can be maintained.

DESCRIPTION OF EMBODIMENTS

Examples will be described below with reference to the drawings. To easily understand the present invention, there is the case where the position, size, shape, range, and the like of each configuration illustrated in the drawings and the like do not represent the actual position, size, shape, range, and the like. Thus, the present invention is not always limited to the position, size, shape, range, and the like disclosed in the drawings and the like.

An example described below includes means for measuring the duty of an input signal from an encoder when a power conversion device performs output so that a motor has a constant speed, automatically switching a speed detection method to full cycle measurement if this is outside of a prescribed value close to 50%, and on the contrary, automatically switching the speed detection method to half cycle measurement if this is within the prescribed value.

According to such a configuration, the motor speed detection method by the encoder signal is not fixed to the full cycle or the half cycle, and it is possible to reduce the number of additional steps such as the replacement of the main body of the power conversion device or its additional device or substrate, and the change, replacement, and the like of a transmission path method from the encoder to the power conversion device, which are caused by inappropriate method selection.

In addition, also when the user conventionally selects the full cycle or the half cycle by parameter setting before the start of use, it is possible to reduce the number of steps for parameter resetting involving the temporary stop of the power conversion device and the motor due to inappropriate parameter setting. It is possible to previously prevent system stop due to abnormality detection in the power conversion device and its host device when the duty is deviated from 50% due to the aging change of the transmission path from the encoder to the power conversion device, and motor speed instability due to the feedback disturbance of the speed control of the power conversion device, so that it is possible to provide the power conversion device that contributes to the reduction of the risk of the increased load to the machine connected to the motor and damage and the improvement in the system availability.

Example 1

In this example, the automatic switching of the motor speed detection method using the encoder signal full cycles or the encoder signal half cycles will be described. That is, when the encoder signal outputs position signals representing M rotation positions per revolution of the rotation equipment, the speed detection using the full cycles measures the speed in M measurement periods per revolution of the rotation equipment, and the speed detection using the half cycles measures the speed in 2×M measurement periods per revolution of the rotation equipment.

Figure 1:
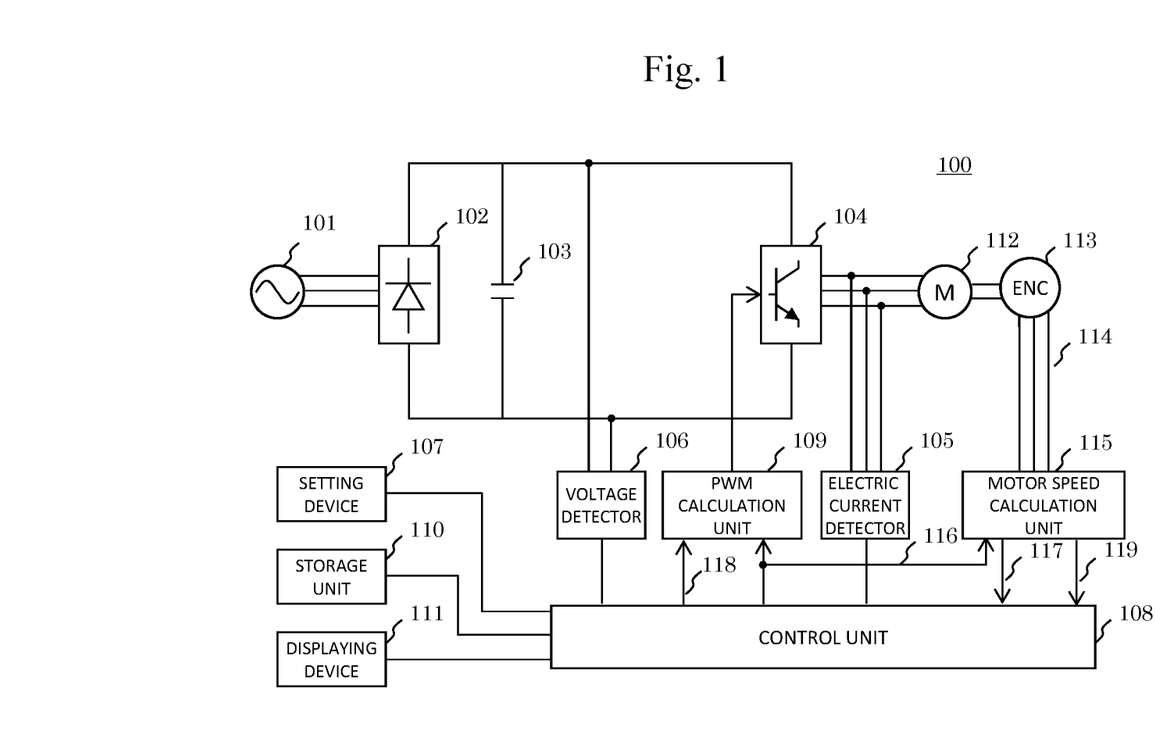
FIG. 1 is a configuration block diagram illustrating an example of a power conversion device.

FIG. 1 is an example of the block diagram of a power conversion device 100 of this example. Typically, the power conversion device 100 is often configured of the part other than an AC power source 101, a motor 112, and an encoder 113 in the drawing. In the drawing, the AC power source 101 and a converter 102, the converter 102 and a smoothing capacitor 103, the smoothing capacitor 103 and an inverter 104 (including a driving circuit), the inverter 104 and the motor 112, the motor 112 and the encoder 113, the encoder 113 and an encoder output signal transmission path (A phase/B phase) 114, and the encoder output signal transmission path (A phase/B phase) 114 and a motor speed calculation unit 115 are connected. It should be noted that the encoder output signal may include, in addition to the A phase and the B phase, a Z phase outputted once per revolution.

As is well known, the encoder has, for example, a disk shape to be mounted on the motor, is provided with slits and the like at fixed intervals in the rotation angle direction of the motor, and generates the encoder signal by light passing through the slits. That is, when the disk is rotated together with the rotation of the motor shaft, light passing through a pair of slits is transmitted and intercepted according to it. This light is converted into an electric signal by a light reception element opposite each of the slits, and is waveform shaped to be outputted as two rectangular wave outputs (A phase, B phase). The pair of slits are disposed so that the phases of the rectangular wave outputs are different from each other by a ¼ pitch, and the A phase and the B phase are ideally shifted by a ¼ cycle. By using the A phase and the B phase, the rotation speed and the rotation direction of the motor can be detected. In this example, for the encoder 113 itself, a typical commercially-available configuration may be used.

In addition, a control unit 108 and each of an electric current detector 105, a voltage detector 106, a PWM (Pulse Width Modulation) calculation unit 109, and the motor speed calculation unit 115 are connected. Further, the electric current detector 105 is connected between the inverter 104 and the motor 112, the voltage detector 106 is connected between the smoothing capacitor 103 and the inverter 104, and the PWM calculation unit 109 is connected to the inverter 104.

The control unit 108 transmits a motor speed instruction 116 to the PWM calculation unit 109 and the motor speed calculation unit 115, and the motor speed calculation unit 115 transmits a detected motor speed 117 to the control unit 108. The control unit uses the detected motor speed 117 for various controls. For example, the motor speed instruction 116 and the detected motor speed 117 are compared to perform feedback speed control. In addition, the motor speed calculation unit 115 transmits, to the control unit 108, a duty measurement-in-progress signal 119 representing that the duty is being measured.

Next, the operation will be described. First, the converter 102 serves to rectify three-phase AC voltage supplied from the commercially-available AC power source 101 to convert the same into DC voltage, and to charge the smoothing capacitor 103. On the other hand, the inverter 104 includes bridge connected transistors and diodes, and serves to convert the DC voltage smoothed by the smoothing capacitor 103 into three-phase AC voltage to supply the same to the motor 112.

The control unit 108 subjects the moment-by-moment motor speed instruction 116 to acceleration and deceleration calculation in a desired pattern such as a straight pattern and an S-shaped pattern, corresponding to the parameters of the speed target value, the highest frequency that is its upper limit value, and the acceleration and deceleration time, which are given from a setting device 107, and transmits this to the PWM calculation unit 109.

At the same time, the control unit 108 transmits a motor voltage instruction 118 calculated separately from the motor speed instruction 116 to the PWM calculation unit 109. Accordingly, the PWM calculation unit 109 performs pulse width modulation calculation from the motor speed instruction 116 and the motor voltage instruction 118, generates a prescribed switching signal, and outputs this to the inverter 104.

As a result, the three-phase AC power at the prescribed voltage and the prescribed frequency corresponding to the speed instructed at this time is supplied from the inverter 104 to the motor 112. A storage unit 110 stores the set values of the parameters of the speed target value, the acceleration time, and the like given from the setting device 107 to the control unit 108, and a displaying device 111 displays the parameter set values that the control unit 108 fetches from the storage unit 110.

Figure 2:
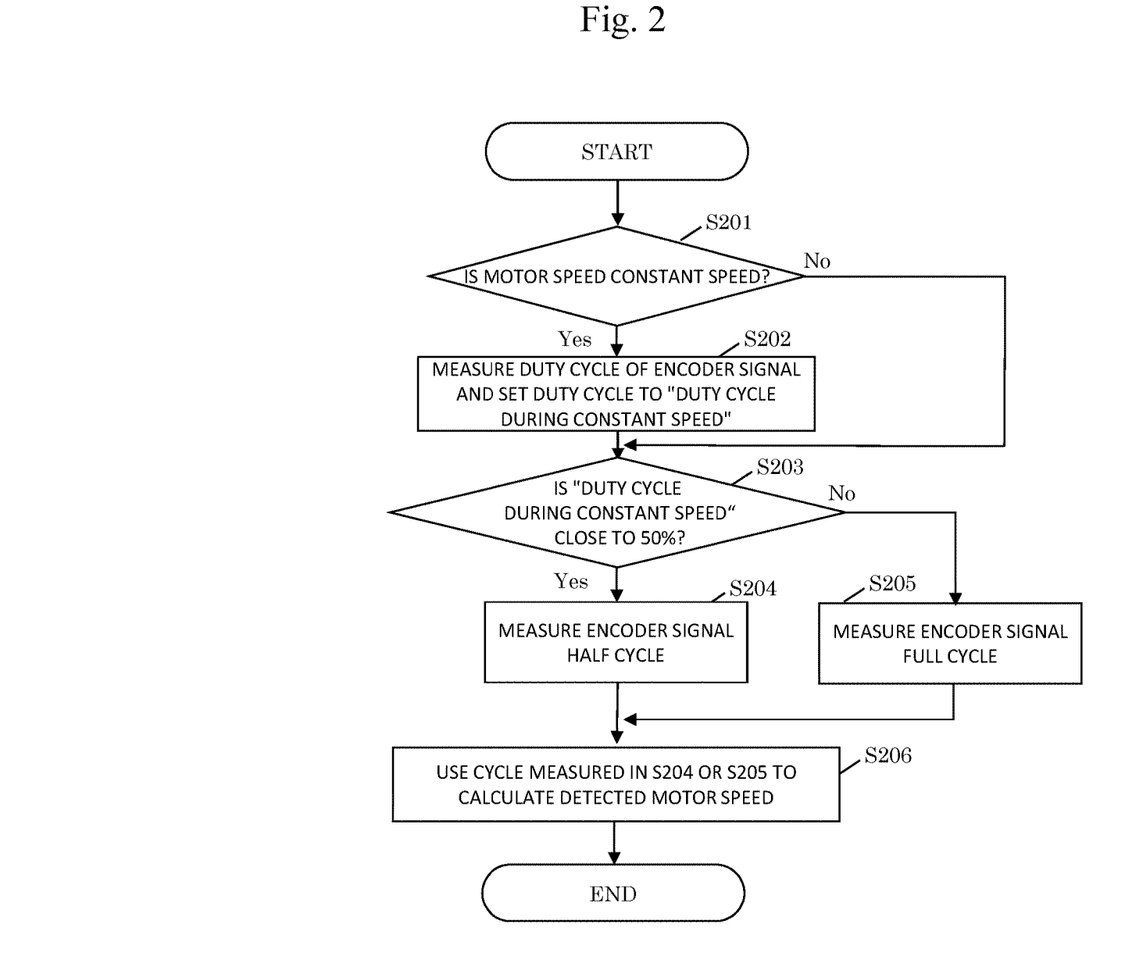
FIG. 2 is a flowchart illustrating an example of a process for automatically switching a speed detection method to full cycle measurement or half cycle measurement according to Example 1.

FIG. 2 is an example of a flowchart illustrating a process for automatically switching the speed detection method to the full cycle measurement or the half cycle measurement according to the input signal duty value from the encoder. The process is performed mainly by the motor speed calculation unit 115 in the power conversion device 100 in FIG. 1. The process for automatically switching the motor speed detection method using the encoder signal full cycle or the encoder signal half cycle will be described with reference to the flowchart in FIG. 2.

Here, first, the process from "START" to "END" in FIG. 2 is repeatedly executed in a fixed period. In the power conversion device 100, the control unit 108 generates the moment-by-moment motor speed instruction 116 by the acceleration and deceleration calculation in a desired pattern, such as a straight pattern and an S-shaped pattern, corresponding to the parameters such as the speed target value, the highest frequency that is its upper limit value, and the acceleration and deceleration time, which are given from the setting device 107. As is well known, the PWM calculation unit 109 is a circuit that changes the duty cycle of the pulse width (the ratio between H and L of the pulse width) according to the magnitude of the input signal (for example, at the DC level) in the fixed period, and controls the motor. The PWM calculation unit 109 generates the control signal controlling the inverter 104 by using the motor speed instruction 116 to control the rotation speed of the motor 112, and when the motor reaches the speed target value, it is brought into the constant speed state.

In the constant speed state, the motor speed instruction 116 transmitted from the control unit 108 to the motor speed calculation unit 115 maintains the value equal to the speed target value. At this time, in the flowchart in FIG. 2, first, the motor speed calculation unit 115 determines whether the motor speed is the constant speed under the condition where the motor speed instruction 116 is not changed from the motor speed instruction 116 during the previous execution, or the motor speed instruction 116 is equal to the speed target value (S201).

If the determination result is "Yes", the motor speed calculation unit 115 measures the duty cycle during constant speed of the encoder signal (S202). Here, to ensure that the motor speed instruction 116 is not changed during the duty cycle measurement, the motor speed calculation unit 115 may output the duty measurement-in-progress signal 119, and the control unit 108 may fix the motor speed instruction 116 to the most recently determined value while this signal is ON. The reason why the above configuration is taken is that when the motor speed is changed during the duty cycle measurement, the duty cycle is changed also due to the change in the motor speed, so that it is desired that the duty cycle change on the basis of the change in the motor speed be excluded.

If the determination result is "No", without newly measuring the duty cycle during constant speed of the encoder signal, the duty cycle during constant speed when the motor speed is previously the constant speed is held. Here, the duty cycle during constant speed of the encoder signal can be calculated in such a manner that for example, the timer that is the peripheral function of the microcomputer is used on the constant clock, thereby using the function of automatically obtaining the timer count values at the timings of both edges of the encoder signal to store them in the register, or the timer count value at the timing of one of the edges of the encoder signal to store it in the register, so that times during which the signal is in the respective "High" and "Low" states can be measured, and the ratio between these is taken.

Next, for example, under the condition in which |the duty cycle during constant speed−50|<the prescribed value, it is determined whether the duty cycle during constant speed is close to 50% (within the range of X %, plus or minus, of the duty cycle 50%) (S203). Here, for the prescribed value X, for example, a small value of 0.5% and the like is selected. If the determination result is "Yes", the encoder signal half cycle is measured (S204). If the determination result is "No", the encoder signal full cycle is measured (S205).

Next, the value of the encoder signal half cycle measured in S204 or the encoder signal full cycle measured in S205 is used to calculate the detected motor speed 117 (S206). Here, as the encoder having p[ppr (Pulse per revolution)] per revolution, the calculation equation of the detected motor speed 117 using the half cycle measured in S204 (Th[s]: the half cycle whose measurement is ended most recently) is $N=60/(2*Th*p)$, and the calculation equation of the detected motor speed 117 using the full cycle (Tf[s]=T1+T2) measured in S205 is N=60/(Tf*p). The detected motor speed 117 is used for the user referring monitor and the speed control. Here, the T1 is the first half cycle, and the T2 is the second half cycle, and ideally, Th=T1=T2, but in this example, the case where this equation is not established is noted.

Figure 3:
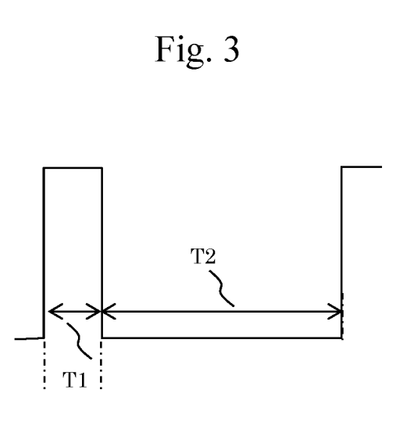
FIG. 3 is a graph of assistance in explaining each cycle of an encoder signal according to the example.

FIG. 3 is an example of a waveform diagram of the one-phase (A phase or B phase) signal of the encoder signal. The duty cycle is the ratio between the pulse cycle time and the one-cycle H level time, so that in FIG. 3, T1×100/(T1+T2) represents the duty cycle. FIG. 3 illustrates the state where the duty cycle is deviated from 50%. Such deviation can be caused by, for example, the characteristic of the electric circuit from the encoder 113 to the motor speed calculation unit 115 in FIG. 1 even when the encoder itself is mechanically perfect. The T1 is a first half cycle [s], and corresponds to, for example, the cycle between the rising and falling of the pulse. The T2 is a second half cycle [s], and corresponds to, for example, the cycle between the falling and rising of the pulse.

Here, in the conventional method for calculating the detected motor speed by using the half cycle of the encoder output signal at all times without performing the switching in the process corresponding to the process S206 in FIG. 2, in the case of the constant speed state in which the one-phase signal of the encoder, as illustrated in FIG. 3, is repeated, a duty D at this time is D=T1*100/(T1+T2)=17%, and when the encoder having p[ppr] (Pulse per revolution) per revolution is mounted on the motor, the motor rotation speeds N[rpm] (Revolution per minites) are alternately calculated by N=60/(2*T1*p) and N=60/(2*T2*p), and when p=1024 [ppr], TF=T1+T2=32.55 [µs], T1=5.5335 [µs], and T2=27.0165 [µs], N=5294 [rpm] and N=1084 [rpm], with the result that the values significantly different from the correctly measured value N=60/(TF*p)≈1800 [rpm] are alternately measured, regardless of the constant speed.

According to the method described in the example, the motor speed detection method by the encoder signal is not fixed to the full cycle or the half cycle, the result obtained by the half cycle measurement is automatically applied only when the duty is close to 50%, and as to the above numerical value example, N=1800 [rpm] can be calculated as the detected motor speed. Thus, it is possible to reduce the number of additional steps such as the replacement of the main body of the power conversion device or its additional device or substrate, and the change, replacement, and the like of the transmission path method from the encoder to the power conversion device, which are caused by inappropriate method selection.

In addition, also when the user conventionally selects the full cycle or the half cycle by parameter setting before the start of use, it is possible to reduce the number of steps for parameter resetting involving the temporary stop of the power conversion device and the motor due to inappropriate parameter setting. It is possible to previously prevent system stop due to abnormality detection in the power conversion device and its host device when the duty is deviated from 50% due to the aging change of the transmission path from the encoder to the power conversion device, and motor speed instability due to the feedback disturbance of the speed control of the power conversion device, so that it is possible to provide the power conversion device that contributes to the reduction of the risk of the increased load to the machine connected to the motor and damage and the improvement in the system availability.

In addition, in this example, when in particular, the motor speed instruction is the constant speed, the state of the signal can be monitored even during the operation to automatically switch the measurement method, so that sudden behavior instability due to the aging change and the like can be prevented. Also, in the case of the using method in which the motor speed instruction 116 is not the constant speed, the motor speed instruction 116 may be separately automatically the constant speed in the control unit 108 for the time necessary for determining whether the speed detection method is the full cycle or the half cycle.

In addition, the encoder of this embodiment may be replaced with a rotary encoder, a linear encoder, an incremental encoder, an encoder converting a resolver signal into the signal corresponding to the encoder and handling the same.

In addition, for the encoder signal, the A phase, the B phase, and the Z phase are typically present, but the configuration method of this speed detection method may be applied to, among these, one of the A phase and the B phase, or may be applied to both of them.

Figure 5:
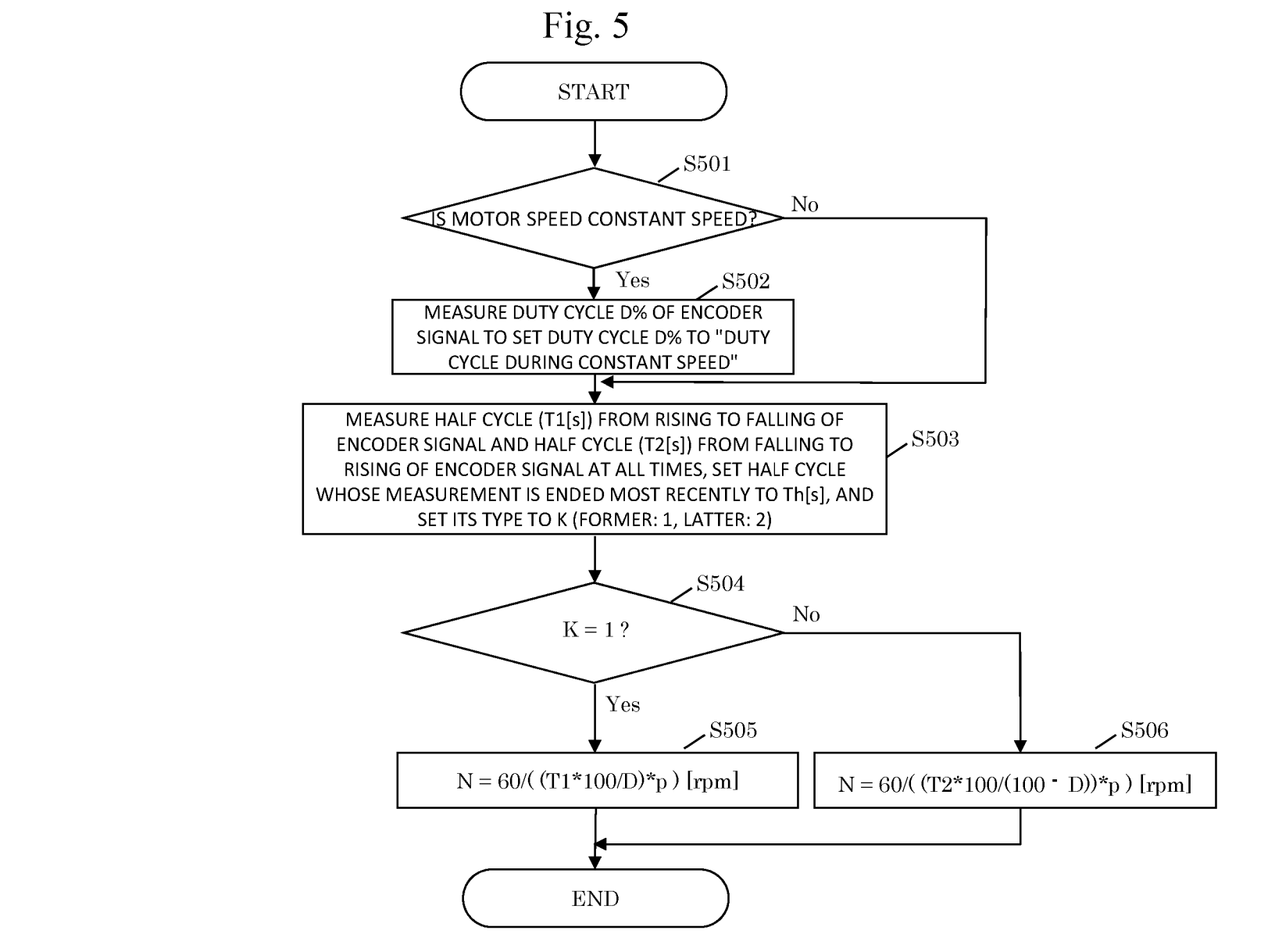
FIG. 5 is a flowchart illustrating an example of a process for measuring an encoder signal half cycle and automatically switching the speed detection process method according to a duty cycle and each half cycle section according to Example 3.

Also for the Z phase, the Z phase pulse in which the duty is 50% in design is targeted, the configuration method of this speed detection method may be applied to this, or the method in FIG. 5 may be applied also when the duty is not 50% in design.

In addition, as the method for determining whether the motor speed is the constant speed, it may be determined that the motor speed is the constant speed when the state where the change between the previous value and the present value of the motor speed instruction 116 in FIG. 1 is within the prescribed range occurs one time or continues a prescribed number of times, it may be determined that the motor speed is the constant speed when the state where the change of the motor speed instruction 116 and the change in the output electric current value to the motor are within the prescribed range occurs one time or continues a prescribed number of times, or it may be determined that the motor speed is the constant speed when the state where the change in the encoder signal half cycle, the encoder signal full cycle, or the change from the previous value of each of the encoder signal half cycle and the encoder signal full cycle is within the prescribed range occurs one time or continues a prescribed number of times.

In addition, here, the half cycle refers to one of the cycle from the rising edge to the falling edge and the cycle from the falling edge to the rising edge, or both. Also, the full cycle refers to one of the cycle between the rising edges and the cycle between the falling edges, or both.

In addition, it is considered that the content of the condition determination S201 of the flowchart in FIG. 2 is changed to "The first constant speed after the power source is turned on for start?" and the determination whether the motor speed is the constant speed is limited to the first one time. In this case, by not performing the determination at all times during the operation, the processing load rate increase in the microcomputer can be prevented, and the cycle measurement method can be fixed after the first determination, so that it is effective for the application disliking the change during the operation. Also, the condition determination S201 of the flowchart in FIG. 2 may be branched by the condition determination each time the motor speed reaches the constant speed after the power source of the device is turned on to start the motor.

In addition, it is considered that the content of the condition determination S201 of the flowchart in FIG. 2 is changed to "The first constant speed reaching after, among the connected motors, the motor to be driven is selected?". There is the case where a plurality of motors are connected via contactors to the output of the power conversion device, and the motor to be driven by the next operation instruction is selected by the controlling signal inputted to the power conversion device and the parameter setting, thereby driving the motor while a plurality of machine shafts are switched by one power conversion device, so that the number of power conversion devices necessary for all the machines is reduced to reduce the cost. When the encoder is mounted on each motor to be selected in such a using method, the encoder cycle measurement method can be switched each time the motor selection is switched under the above determination condition.

In addition, it is considered that the content of the condition determination S201 of the flowchart in FIG. 2 is changed to "The first constant speed reaching after the parameter of the motor to be driven is set?". This means that when one motor is newly connected without performing the motor switching, or when each motor to be motor switched is newly connected, there is the case where to perform appropriate control according to the characteristic of each motor, the electric circuit constant of the motor is parameter set, or the power conversion device performs automatic measurement, but at the first constant speed reaching after the parameter setting or the automatic measurement is performed, the encoder signal cycle measurement method is determined once and switched.

In addition, it is considered that the content of the condition determination S201 of the flowchart in FIG. 2 is changed to "The first constant speed reaching after the parameter provided in the power conversion device and representing the characteristic of the encoder mounted on the motor to be driven is set?". This means that for example, the encoder cycle measurement method is switched after the parameter previously provided in the power conversion device and representing the number of encoder pulses per revolution of the motor with the encoder is set according to the connected motor.

Example 2

As another embodiment, there is a method in which without switching the full cycle measurement and the half cycle measurement, the encoder signals in the same phase are inputted to two-system measurement means (for example, the two-channel timer of the microcomputer), one of the channels measures the half cycle and the other channel measures the full cycle at all times, the channels respectively detect the motor speeds, and each of the detected motor speeds of the two systems is selected and used.

Figure 4:
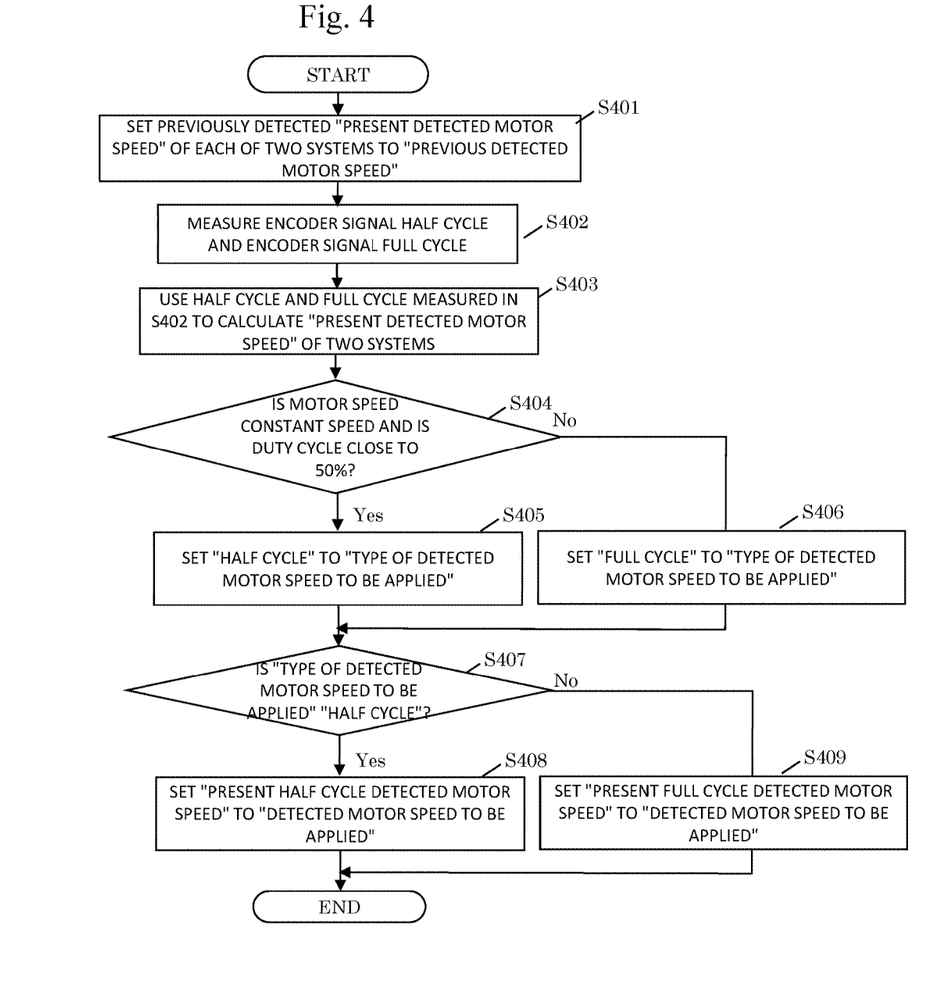
FIG. 4 is a flowchart illustrating an example of a process for automatically switching the detected speed to be applied to the speed by the full cycle measurement or the speed by the half cycle measurement according to Example 2.

FIG. 4 is a flowchart of assistance in explaining a process executed by the motor speed calculation unit 115 of Example 2. This flow is periodically repeated as in the flow in FIG. 2 of Example 1.

In a process S401, the previously detected "present half cycle detected motor speed" is set to the data of the "previous half cycle detected motor speed", and the previously detected "present full cycle detected motor speed" is set to the data of the "previous full cycle detected motor speed".

In a process S402, both of the encoder signal half cycle and the encoder signal full cycle are measured. In a process S403, the encoder signal half cycle measured in the process S402 is used to calculate the "present half cycle detected motor speed", and in parallel, the encoder signal full cycle measured in the process S402 is used to calculate the "present full cycle detected motor speed".

In a process S404, it is determined whether the motor speed instruction is the constant speed and the duty cycle is close to 50%. This process can be performed as in Example 1.

At this time, according to whether the duty cycle is close to 50% at the constant speed, the measurement result of one of the full cycle and the half cycle measured in the process S402 may be selected to calculate the detected motor speed of one of them in the process S403. Alternatively, as illustrated in the process S403 in FIG. 4, the detected motor speeds may be calculated for both the full cycle and the half cycle at all times, it may be determined in the process S404 whether or not the duty cycle is close to 50% at the constant speed, and the detected motor speed to be applied may be selected.

In Example 2, since the encoder signal half cycle and the encoder signal full cycle are measured at all times in the process S402, the modification of the process S404 can also be adopted by using this.

As the specific example of the modification in which it is determined in the process S404 whether the motor speed is the constant speed, it is determined whether the change between the "previous full cycle detected motor speed" and the "present full cycle detected motor speed" is within the prescribed range. Alternatively, it may be determined whether the change between the "previous T1 half cycle detected motor speed" and the "present T1 half cycle detected motor speed" is within the prescribed range. Alternatively, it may be determined whether the change between the "previous T2 half cycle detected motor speed" and the "present T2 half cycle detected motor speed" is within the prescribed range. From the determination of these, if the change is within the prescribed range, it can be determined that the motor speed is the constant speed. At this time, the determination using the motor speed instruction described in Example 1 is used together, the reliability of the determination is improved.

Also, the determination whether or not the duty cycle is close to 50% may be configured as in Example 1, but there is a method in which in the state where it is determined that the motor speed is the constant speed by the method described in the process S404 and the like, the half cycles are alternately measured at all times in such a manner of the T1, the T2, the T1, and the T2 at all times, and the detected motor speeds calculated on the basis of the half cycles are used. That is, the detected motor speeds calculated by the calculation equation assuming that the duty cycle is 50%, derived from the immediately previous half cycle, that is, the T1 and the present half cycle, that is, the T2 may be compared each time the motor speed is the constant speed, and according to whether the change is within the prescribed range, it may be determined whether the duty cycle is close to 50%.

That is, according to whether the change between the previous "half cycle detected motor speed" and the present "half cycle detected motor speed" is within the prescribed range, it can be indirectly determined whether or not the duty cycle is close to 50%. That is, it is assumed that referring to FIG. 3, the previous half cycle is the T1 and the present half cycle is the T2, and when the duty cycle is close to 50%, the T1 and the T2 are almost equal during constant speed, and as a result, the half cycle detected motor speeds obtained from the respective T1 and T2 are almost equal.

When this phenomenon is used, the determination whether or not the duty cycle is close to 50% and the detection of the constant speed state can be performed at the same time. That is, if the change between the half cycle detected motor speeds using the T1 and the T2 is within the prescribed range, it can be determined that the motor speed is the constant speed and the duty cycle is close to 50%, and if the change between the half cycle detected motor speeds using the T1 and the T2 is outside of the prescribed range, it can be determined that the duty cycle is deviated from 50% or the motor is in the acceleration and deceleration state.

In this case, when the determination is performed at all times, the full cycle detected motor speed is adopted in the acceleration and deceleration state, but if the change between the half cycle detected motor speeds is within the prescribed range in the fixed period, it is defined that the half cycle is adopted in the fixed period thereafter, so that the full cycle can be avoided from being adopted at all times during the acceleration and deceleration. Of course, when the constant speed determination using the motor speed instruction is used together, the reliability of the determination is improved.

In addition, when the motor is not the constant speed, it is also considered that by taking the acceleration and deceleration rate of the motor 112 calculated as the motor speed instruction 116 by the control unit 108 into consideration, the future T1 and T2 half cycles are predicted and calculated, and according to whether the difference between the half cycle detected from each of the values the future T1 and T2 half cycles and the signal is within the prescribed range, it is determined that the duty cycle is close to 50%. That is, for example, it can be determined that in the case, on the basis of the acceleration rate, of the T1 half cycle for the duty cycle 50% and where the next T2 half cycle can be calculated to be 80% that is the present duty cycle, when the T2 half cycle detected from the encoder signal is deviated from the 80% and beyond the prescribed range, the duty cycle is not close to 50%.

Therefore, the control is performed such that if the change between the previous "half cycle detected motor speed" and the present "half cycle detected motor speed" is within the prescribed range, the half cycle detected motor speed is used as-is, and if the change between the previous "half cycle detected motor speed" and the present "half cycle detected motor speed" is outside of the prescribed range, the half cycle detected motor speed is switched to the full cycle detected motor speed.

If "Yes" from the determination in the process S404, the "half cycle" is set to the "type of the detected motor speed to be applied" that is the controlling flag (a process S405). If "No", the "full cycle" is set to the "type of the detected motor speed to be applied" (a process S406).

In a process S407, the "type of the detected motor speed to be applied" that is the controlling flag is checked, and it is determined whether it is the "half cycle".

If "Yes" from the determination in the process S407, the "present half cycle detected motor speed" is used as the "detected motor speed to be applied" that is the control data (S408). If "No", the "present full cycle detected motor speed" is used as the "detected motor speed to be applied" that is the control data (S409). The motor speed calculation unit 115 transmits the "detected motor speed to be applied" as the detected motor speed 117 to the control unit 108.

Here, in the encoder has the half cycle whose measurement is ended most recently being Th[s], the full cycle being (Tf[s]=T1+T2), and p[ppr] (Pulse per revolution) per revolution of the motor, the calculation equation of the "present half cycle detected motor speed" N[rpm] in the process S403 is N=60/(2*Th*p), and the calculation equation of the "present full cycle detected motor speed" N[rpm] in the process S403 is N=60/(Tf*p).

As described above, Example 2 illustrates that the detected motor speeds by the encoder signal full cycle and the encoder signal half cycle are calculated at all times, and without directly measuring the duty cycle during constant speed, and according to the change between the detected motor speeds from the half cycles, it is possible to select the value of the detected motor speed to be applied from the half cycle, or the value of the detected motor speed to be applied from the full cycle.

Example 3

FIG. 5 is a flowchart of assistance in explaining a process executed by the motor speed calculation unit 115 of Example 3. In Example 3, the same effect can be obtained by switching the process to be applied without performing the switching the encoder signal full cycle measurement and the encoder signal half cycle measurement. That is, the duty cycle is measured when the motor has the constant speed, the encoder signal half cycle is measured at all times, and the measured half cycle is specified to be the former half cycle or the latter half cycle. With this, according to whether the most recent half cycle is the former half cycle or the latter half cycle, the process for detecting the motor speed from the half cycle is selected to calculate the correct speed.

In a process S501, as in Example 1, it is determined whether the motor speed is the constant speed. In a process S502, when the motor speed is the constant speed, the duty cycle D % during constant speed of the encoder signal is measured, and is set to the data of "the duty cycle during constant speed".

On the other hand, in a process S503, the motor speed calculation unit 115 measures the half cycle from the rising to the falling of the encoder signal (T1[s]) and the half cycle from the falling to the rising of the encoder signal (T2[s]) at all times (see FIG. 3). The half cycle whose measurement is ended most recently is set to Th[s], and its type is set to a variable K. For example, its type is set such that when the T1 is measured most recently, K=1, and when the T2 is measured most recently, K=2.

In a process 504, the branching for selecting the equation calculating the motor rotation speed N by the variable K is performed.

When the T1 is measured most recently, N=60/((T1*100/D)*p)[rpm] (S505), and when the T2 is measured most recently, N=60/((T2*100/(100−D))*p)[rpm] (S506).

Example 3 illustrates the process in which the half cycle from the rising to the falling of the encoder signal and the half cycle from the falling to the rising of the encoder signal are measured at all times, the full cycle is calculated from both of the half cycles according to the duty cycle D during constant speed, and the detected motor speed is calculated from this value, according to the present invention.

From the above processes, the full cycle is calculated in each half cycle according to each half cycle and the duty during constant speed D, so that the correct detected motor speed can be calculated. Also, as compared with the half cycle/full cycle measurement switching, even when the duty cycle during constant speed is far from 50% and the full cycle measurement is applied in the first embodiment, the time axis resolution is maintained to be equal to the half cycle, and the accuracy of the detected motor speed can also be maintained.

As described in the above examples, when the duty cycle of the encoder output signal is not 50% although the motor is rotated at the constant speed, there is a problem that in the half cycle detection method, the signal former half cycle and the signal latter half cycle are different, so that the detected speed is not stable. In this example, by changing the detection method according to the state of the duty cycle, while the advantage of the half cycle measurement method that can determine the speed for a short time is provided, the above problem is solved. With this configuration, in this example, it is possible to provide the speed detection method that maintains the fine time axis resolution and the power conversion device that uses the same.

It should be noted that the present invention is not limited to the above examples, and includes various modifications. For example, the above examples have been described in detail for simply describing the present invention, and do not necessarily include all the described configurations. Also, part of the configuration of one of the examples can be replaced with the configurations of the other examples, and in addition, the configuration of one of the examples can be added with the configurations of the other examples. Also, part of the configuration of each of the examples can be subjected to the addition, deletion, and replacement of the other configurations.

Also, some or all of the above respective configurations, functions, processing units, processing means, and the like may be achieved by hardware, for example, by designing by an integrated circuit and the like. Also, the above respective configurations, functions, and the like may be achieved by software in such a manner that for example, the motor speed calculation unit 115 includes the microcomputer, and the processor interprets and executes the program achieving each function. The information of the program, table, file, and the like achieving each function can be placed on a memory, a recording device, such as a hard disk and an SSD (Solid State Drive), or a recording medium, such as an IC card, an SD card, and a DVD.

Also, the control line and the information line that are considered to be necessary for the description are illustrated, and all the control lines and the information lines are not necessarily represented from a product viewpoint. It may be considered that actually, almost all the configurations are connected to each other.

INDUSTRIAL APPLICABILITY

The present invention can be used for the speed calculation device and the power conversion device that uses the same.

REFERENCE SIGNS LIST

101 . . . AC power source,
102 . . . converter,
103 . . . smoothing capacitor,
104 . . . inverter (including a driving circuit),
105 . . . electric current detector,
106 . . . voltage detector,
107 . . . setting device,
108 . . . control unit,
110 . . . storage unit,
111 . . . displaying device,
112 . . . motor,
113 . . . encoder,
114 . . . encoder output signal transmission path (A phase/B phase),
115 . . . motor speed calculation unit,
116 . . . motor speed instruction,
117 . . . detected motor speed,
118 . . . motor voltage instruction,
119 . . . duty measurement-in-progress signal

The invention claimed is:

1. A speed calculation device that calculates a speed of an object to be driven from output pulses obtained from an encoder connected to the object to be driven,
wherein a duty ratio of a time of a half cycle from a rising edge to a falling edge of the output pulses to a time of a full cycle between rising edges of the output pulses is measured based on a motor speed instruction,
wherein the speed calculation device outputs a duty measurement-in-progress signal while the duty ratio is being measured, and the motor speed instruction is fixed to a most recently determined value while the duty measurement-in-progress signal is being outputted,
wherein the speed is calculated using the half cycles of the output pulses if the duty ratio is within a prescribed range, and
wherein the speed is calculated using the full cycles of the output pulses if the duty ratio is outside of the prescribed range.

2. The speed calculation device according to claim 1,
wherein it is determined whether the rotation speed of the object to be driven is a constant speed,
wherein the duty cycle of the output pulses when the rotation speed of the object to be driven is the constant speed is measured.

3. The speed calculation device according to claim 1,
wherein the prescribed range is X %, plus or minus, of the duty cycle 50% (where X is a prescribed threshold value).

4. A power conversion device comprising:
an inverter for converting DC voltage into AC voltage and supplying the AC voltage to a motor;
a motor speed calculation unit for calculating a speed of the motor from output pulses obtained from an encoder connected to the motor based on a motor speed instruction; and
a control unit for outputting the motor speed instruction to the motor speed calculation unit receiving the motor speed from the motor speed calculation unit and controlling the inverter,
wherein the motor speed calculation unit:
measures a duty ratio of a time of a half cycle from a rising edge to a falling edge of the output pulses to a time of a full cycle between rising edges of the output pulses;
outputs a duty measurement-in-progress signal to the control unit while the duty ratio is being measured;
calculates the speed using the half cycles of the output pulses if the duty ratio is within a prescribed range from 50%;
calculates the speed using the full cycles of the output pulses if the duty ratio is outside of the prescribed range from 50%; and
wherein the control unit fixes the motor speed instruction to a most recently determined value while the duty measurement-in-progress signal is being outputted.

5. The power conversion device according to claim 4,
wherein the measurement of the duty cycle and the selection of the speed calculation method are performed at the first constant speed reaching after the power source of the device is turned on to start the motor.

6. The power conversion device according to claim 4, wherein the measurement of the duty cycle and the selection of the speed calculation method are performed each time the constant speed is reached after the power source of the device is turned on to start the motor.

7. The power conversion device according to claim 4, wherein the measurement of the duty cycle and the selection of the speed calculation method are performed at the first constant speed reaching after, among a plurality of connected motors, the motor to be driven is selected.

8. The power conversion device according to claim 4, wherein the measurement of the duty cycle and the selection of the speed calculation method are performed at the first constant speed reaching after the parameter of the motor to be driven is set.

9. The power conversion device according to claim 4, wherein the measurement of the duty cycle and the selection of the speed calculation method are performed at the first constant speed reaching after the parameter of the motor to be driven is automatically measured.

10. The power conversion device according to claim 4, wherein the measurement of the duty cycle and the selection of the speed calculation method are performed at the first constant speed reaching after the parameter for representing the characteristic of the encoder mounted on the motor to be driven is set.

11. The power conversion device according to claim 4, wherein the timing at which the duty cycle of the output pulses is measured is the timing at which it is determined that the motor has the constant speed, and wherein for the determination of the timing, the control unit uses a motor speed instruction given to the inverter to control the speed of the motor.

12. The power conversion device according to claim 4, wherein the motor speed calculation unit indirectly measures the duty cycle of the output pulses on the basis of the change between the speeds calculated by using the half cycles of the output pulses.

13. The power conversion device according to claim 4, wherein the motor speed calculation unit:
obtains the prediction value of the half cycle of the future output pulse on the basis of the acceleration and deceleration rate of the motor by the motor speed instruction calculated by the control unit; and
compares the prediction value with the half cycles detected from the output pulses, and determines whether the duty cycles are within the prescribed range from 50%.

14. A power conversion device comprising:
an inverter for converting DC voltage into AC voltage and supplying the same AC voltage to a motor;
a speed calculation unit for calculating the speed of the motor from output pulses obtained from an encoder connected to the motor; and
a control unit for receiving the speed from the speed calculation unit and controlling the inverter,
wherein the speed calculation unit:
measures the duty cycle during constant speed of the output pulses;
measures a first half cycle of the output pulse to calculate the motor speed by first calculation using the duty cycle during constant speed with respect to the first half cycle; and
measures a second half cycle of the output pulse to calculate the motor speed by second calculation using the duty cycle during constant speed with respect to the second half cycle;
wherein the first half cycle T1 that is the half cycle from first transition to second transition of the output pulse is measured,
wherein the second half cycle T2 that is the half cycle from the second transition to the first transition of the output pulse is measured, and
wherein the first calculation or the second calculation is applied to the half cycle whose measurement is ended most recently, and the most recent motor speed is calculated,
wherein the first calculation is $N=60/((T1\times100/D)\times p)$ [rpm], and the second calculation is $N=60/((T2\times100/(100-D))\times p)$[rpm], where N is the rotation number (rpm) of the motor, D is the duty cycle during constant speed (%), the T1 is the length of the first half cycle (sec), the T2 is the length of the second half cycle (sec), and p is the number of pulses [ppr] generated by the encoder per revolution of the motor.

* * * * *